US008136880B2

(12) United States Patent
Biaud et al.

(10) Patent No.: US 8,136,880 B2
(45) Date of Patent: Mar. 20, 2012

(54) ADJUSTABLE WIDTH JUVENILE VEHICLE SEAT

(75) Inventors: Richard M. Biaud, Trementines (FR); Gilles Lhomme, Chateau d'Olonne (FR)

(73) Assignee: Cosco Management, Inc., Wilmington, DE (US)

( * ) Notice: Subject to any disclaimer, the term of this patent is extended or adjusted under 35 U.S.C. 154(b) by 79 days.

(21) Appl. No.: 12/777,893

(22) Filed: May 11, 2010

(65) Prior Publication Data

US 2010/0289307 A1    Nov. 18, 2010

(30) Foreign Application Priority Data

May 12, 2009  (FR) ...................................... 09 53134

(51) Int. Cl.
*A47D 1/10*  (2006.01)
*A47C 7/14*  (2006.01)
(52) U.S. Cl. .................. 297/250.1; 297/284.9
(58) Field of Classification Search ............... 297/250.1, 297/284.1, 284.9
See application file for complete search history.

(56) References Cited

U.S. PATENT DOCUMENTS

| 4,370,000 | A | * | 1/1983 | Kazaoka et al. | 297/284.9 |
| 5,098,157 | A | * | 3/1992 | Surot | 297/250.1 |
| 5,496,092 | A | * | 3/1996 | Williams et al. | 297/250.1 |
| 5,645,317 | A | * | 7/1997 | Onishi et al. | 297/250.1 |
| 5,681,084 | A | * | 10/1997 | Yoneda | 297/284.9 |
| 5,810,436 | A | * | 9/1998 | Surot | 297/284.9 X |
| 5,810,445 | A |  | 9/1998 | Surot |  |
| 6,045,183 | A | * | 4/2000 | Weber | 297/250.1 |
| 6,474,735 | B1 | * | 11/2002 | Carnahan et al. | 297/250.1 |
| 6,478,377 | B2 | * | 11/2002 | Kassai et al. | 297/256.1 |
| 6,481,794 | B1 | * | 11/2002 | Kassai et al. | 297/250.1 |
| 6,485,101 | B2 | * | 11/2002 | Kassai et al. | 297/250.1 |
| 6,659,564 | B2 | * | 12/2003 | Kassai et al. | 297/250.1 X |
| 6,705,675 | B1 | * | 3/2004 | Eastman et al. | 297/250.1 |
| 6,857,700 | B2 | * | 2/2005 | Eastman et al. | 297/250.1 |
| 7,631,935 | B2 | * | 12/2009 | Chen et al. | 297/284.9 |
| 2004/0245826 | A1 | * | 12/2004 | Jane Santamaria | 297/284.9 |
| 2008/0169692 | A1 |  | 7/2008 | Clement et al. |  |

FOREIGN PATENT DOCUMENTS

EP      0816163       1/1998
WO    2005079159      9/2005

OTHER PUBLICATIONS

International Search Report dated Dec. 9, 2009, for FR 0953134.

* cited by examiner

*Primary Examiner* — Rodney B White
(74) *Attorney, Agent, or Firm* — Barnes & Thornburg LLP

(57) ABSTRACT

A juvenile vehicle seat includes a base, a seat back, and a width controller. The base includes a seat bottom and first and second armrests mounted for pivotable movement on opposite sides of the seat bottom. The width controller can be operated to cause the first and second armrests to pivot relative to one another and to the seat bottom.

21 Claims, 8 Drawing Sheets

ADJUSTABLE WIDTH JUVENILE VEHICLE SEAT

BACKGROUND

The present disclosure relates to child restraints, and particularly to a juvenile vehicle seat. More particularly, the present disclosure relates to a juvenile vehicle seat including a base including a pair of armrests flanking a seat bottom and a seat back including a pair of side wings flanking a backrest.

SUMMARY

In accordance with the present disclosure, a juvenile vehicle seat includes a base and a seat back. The base includes a seat bottom located between movable first and second armrests. The seat back includes a backrest located between movable first and second side wings. A child-restraint harness is coupled to the seat bottom and the backrest.

In illustrative embodiments, the juvenile vehicle seat further includes a width-control system comprising a rotatable actuator associated with the seat bottom, a first armrest mover coupled to the rotatable actuator and the first armrest, a first side wing mover coupled to the first armrest and the first side wing, a second armrest mover coupled to the rotatable actuator and the second armrest, and a second side wing mover coupled to the second armrest and the second side wing. The first and second armrest movers cooperate to pivot the first and second armrests about pivot axes relative to the seat bottom in response to rotation of the actuator. The first and second side wing movers cooperate to pivot the first and second side wings about pivot axes relative to the backrest in response to pivoting movement of the first and second armrests. Such pivoting movement of the armrests and side wings results in widening or narrowing the effective width of the base and seat back to conform the seat to match a size of a child seated on the seat bottom at the option of a caregiver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1A:
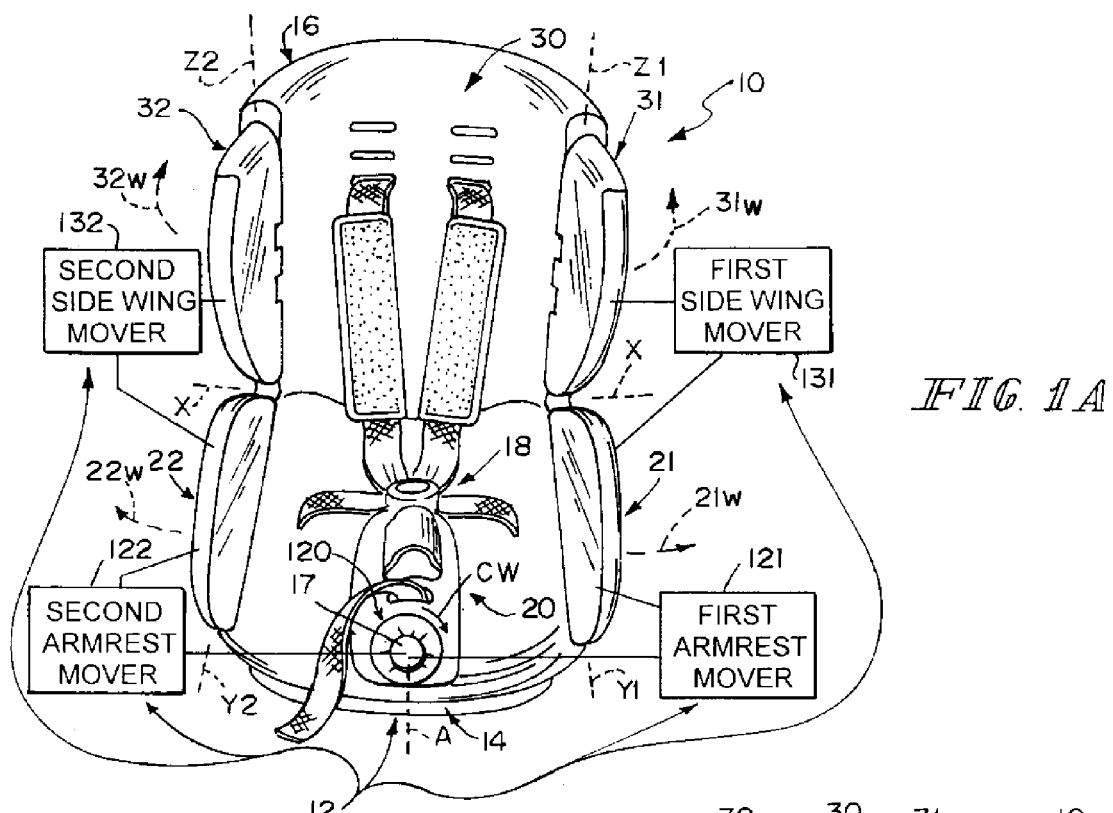
FIG. 1A is a perspective view of a juvenile vehicle seat including a base comprising a seat bottom located between movable first and second armrests, a seat back comprising a backrest located between movable first and second side wings, a child-restraint harness coupled to the seat bottom and the backrest, and a width-control system comprising a rotatable actuator associated with the seat bottom, a first armrest mover coupled to the rotatable actuator and the first armrest, a first side wing mover coupled to the first armrest and the first side wing, a second armrest mover coupled to the rotatable actuator and the second armrest, and a second side wing mover coupled to the second armrest and the second side wing.

A juvenile vehicle seat 10 includes a width controller 12 configured to move, in unison, first and second armrests 21, 22 mounted for pivotable movement on a seat bottom 20 toward and away from one another at the option of a caregiver to change the effective width of a base 14 of juvenile vehicle seat 10 from a narrow-width base dimension shown in FIG. 1A to an expanded-width base dimension shown in FIG. 13. In illustrative embodiments, width controller 12 also includes means for moving, in unison, first and second side wings 31, 32 mounted for pivotable movement on a backrest 30 toward and away from one another in response to pivoting movement of the first and second armrests 21, 22 to change the effective width of a seat back 16 of juvenile vehicle seat 10 from a narrow-width seat-back dimension shown in FIG. 1A to an expanded-width seat-back dimension shown in FIG. 1B.

Base 14 includes a seat bottom 20 and pivotable first and second armrests 21, 22 as shown, for example, in FIG. 1A. Seat bottom 20 is located between first and second armrests 21, 22.

First armrest 21 is mounted on a right side of seat bottom 20 for pivotable movement about a first Y-axis Y1 relative to seat bottom 20 under the control of a caregiver-operated width controller 12 as suggested in FIG. 1A. In use, first armrest 21 can be pivoted away from seat bottom 20 in a clockwise direction 21w to move from the upright position shown in FIG. 1A toward the spread position shown in FIG. 1B so as to widen base 14. First armrest 21 also can be pivoted toward seat bottom 20 in a counterclockwise direction 21n to move back from the spread position shown in FIG. 1B toward the initial upright position shown in FIG. 1A so as to narrow base 14.

Second armrest 22 is mounted on a left side of seat bottom 20 for pivotable movement about a second Y-axis Y2 relative to seat bottom 20 in response to operation of width controller 12 as suggested in FIG. 1A. In use, second armrest 22 can be pivoted away from seat base 20 in a counterclockwise direction 22w to move from the upright position shown in FIG. 1A toward the spread position shown in FIG. 1B so as to widen base 14. Second armrest 22 also can be pivoted toward seat base 20 in a clockwise direction 22n to move back from the spread position shown in FIG. 1B toward the initial upright position shown in FIG. 1A so as to narrow base 14.

Seat back 16 includes a backrest 30 and pivotable first and second side wings 31, 32 as shown, for example, in FIG. 1A. Backrest 30 is located between first and second side wings 31, 32. Backrest 30 is arranged to extend upwardly from a rear edge of seat bottom 20 as suggested in FIGS. 1A, 1B, and 3.

First side wing 31 is mounted on a right side of backrest 30 for pivotable movement about a first Z-axis Z1 relative to backrest 30 in response to operation of width controller 12 as suggested in FIG. 1A. In use, first side wing 31 can be pivoted away from backrest 30 in a clockwise direction 31w to move from the upright position shown in FIG. 1A toward the spread position shown in FIG. 1B so as to widen seat back 16. First side wing 31 also can be pivoted toward backrest 30 in a clockwise direction 31n to move back from the spread position shown in FIG. 1B toward the initial upright position shown in FIG. 1A so as to narrow to seat back 16.

Second side wing 32 is mounted on a left side of backrest 30 for pivotable movement about a second Z-axis Z2 relative to backrest 30 in response to operation of width controller 12 as suggested in FIG. 1A. In use, second side wing 32 can be pivoted away from backrest 30 in clockwise direction 32w to move from the upright position shown in FIG. 1B so as to widen seat back 16. Second side wing 32 also can be pivoted toward backrest 30 in a counterclockwise direction 32n to move back from the spread position shown in FIG. 1B toward the initial upright position shown in FIG. 1A so as to narrow seat back 16.

A child-restraint harness 18 is included in juvenile vehicle seat 10 in an illustrative embodiment shown in FIG. 1A. Shoulder straps included in harness 18 are coupled to backrest 30 and hip straps included in harness 18 are coupled to seat bottom 20 in any suitable manner in an illustrative embodiment. Although a five-point harness system is illustrated, it is within the scope of this disclosure to use any suitable child-restraint harness.

Figure 2A:
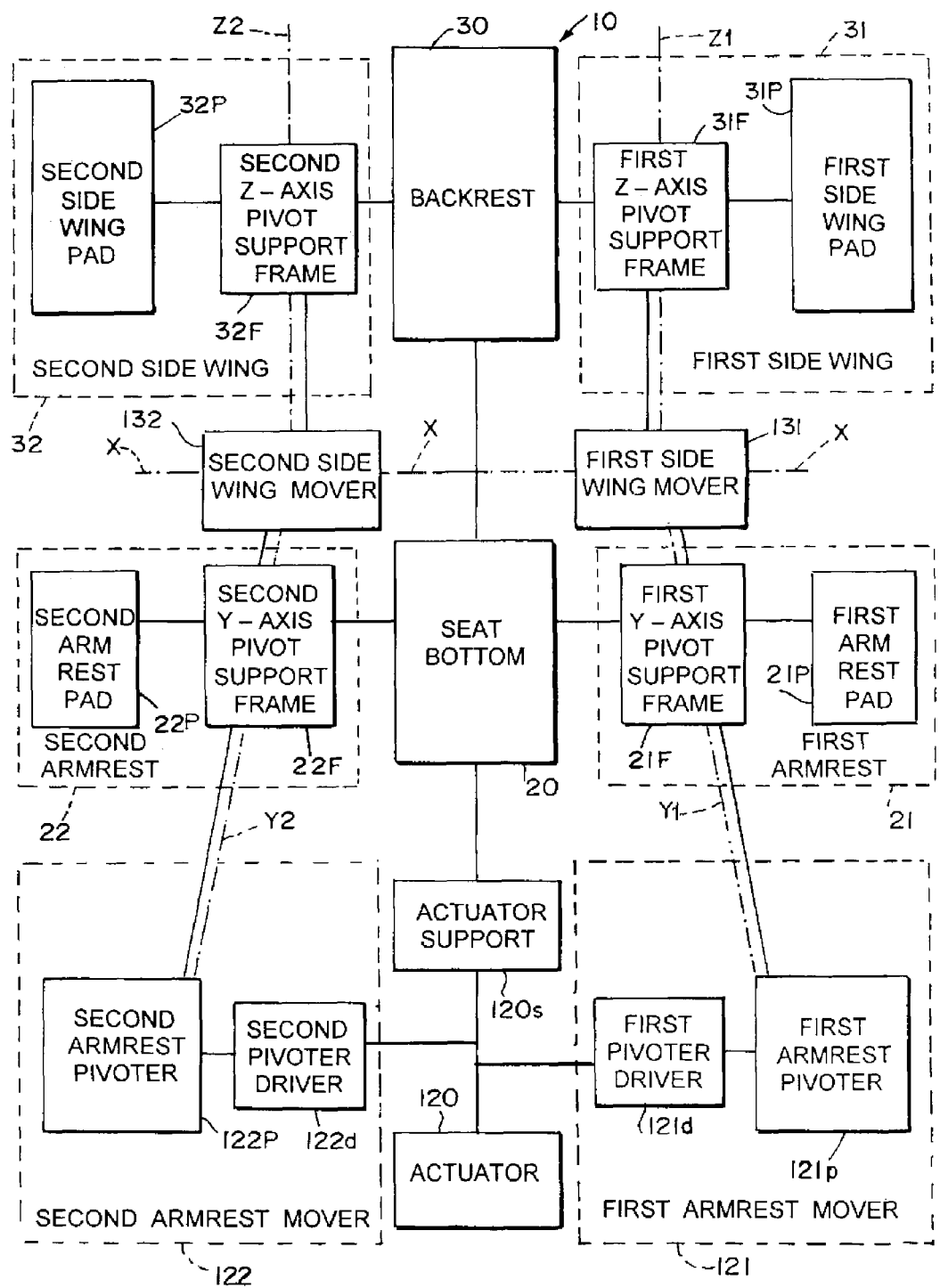
FIG. 2A is a diagrammatic illustration of a juvenile vehicle seat in accordance with the present disclosure suggesting, for example, that the first armrest mover includes a first armrest pivoter coupled to a first Y-axis pivot support frame included in the first armrest and a first pivoter driver coupled to the actuator and the first armrest pivoter and that the first side wing mover is configured to provide means for pivoting the first side wing about a first Z-axis relative to the backrest in response to pivoting movement of the first armrest about a first Y-axis relative to the seat bottom (by rotating a first Z-axis pivot support included in the first side wing in response to rotation of the first Y-axis pivot support frame included in the first armrest) to widen or narrow the seat back during widening or narrowing of the base and also suggesting that a similar second armrest mover is provided for pivoting the second armrest about a second Y-axis and a similar second side wing mover is provided for pivoting the second side wing about a second Z-axis in response to pivoting movement of the second armrest about the second Y-axis.

As suggested diagrammatically in FIGS. 1A and 2A, width controller 12 includes a rotatable actuator 120, a first armrest mover 121, a first side wing mover 131, a second armrest mover 122, and a second side wing mover 132. First armrest mover 121 is coupled to first armrest 21 and to rotatable actuator 120. First side wing mover 131 is coupled to first armrest 21 and to first side wing 31. Second armrest mover 122 is coupled to second armrest 22 and to rotatable actuator 120. Second side wing mover 132 is coupled to second armrest 22 and to second side wing 32.

Figure 1B:
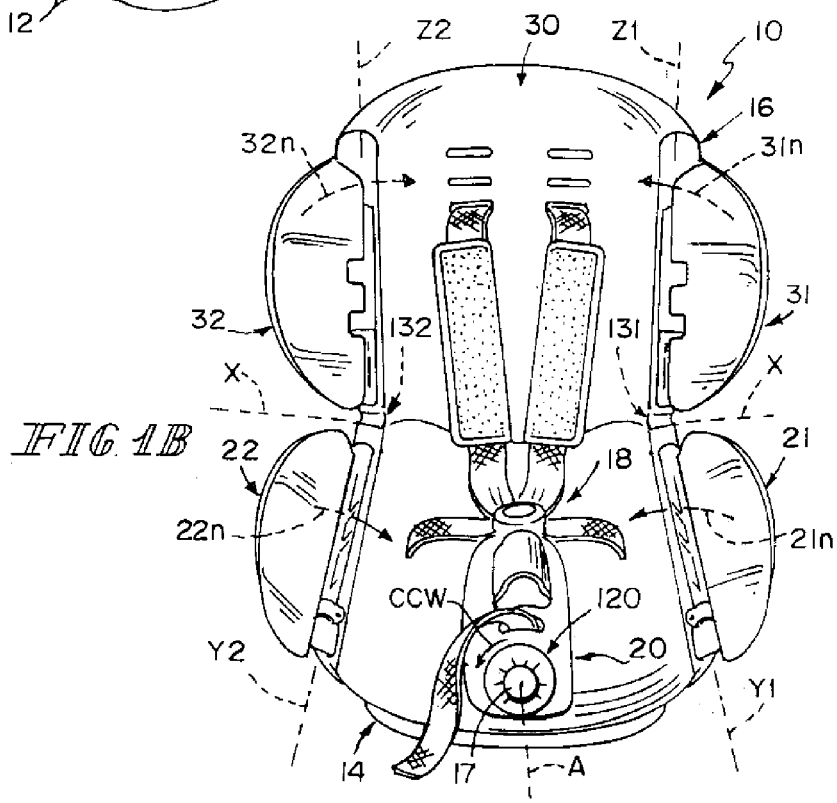
FIG. 1B is a perspective view of the juvenile vehicle seat of FIG. 1 after a caregiver has rotated the rotatable actuator in a clockwise direction about its axis of rotation (1) to actuate the first and second armrest movers to cause the movable first and second armrests to pivot in unison (in opposite directions away from one another) about companion armrest pivot axes and relative to the seat bottom and move from a drawn-together orientation shown in FIG. 1 establishing a narrow-width base dimension to a spread-apart orientation shown in FIG. 1B to widen the base by establishing an expanded-width base dimension and (2) to actuate the first and second side wing movers to cause the movable first and second side wings to pivot in unison (in opposite directions away from one another) about companion armrest pivot axes and relative to the backrest and move from a drawn-together orientation shown in FIG. 1A establishing a narrow-width seat-back dimension to a spread-apart orientation establishing an expanded-width seat-back dimension shown in FIG. 1B to widen the seat back in response to widening of the base.

By rotating the rotatable actuator 120 in, for example, a clockwise direction CW about an axis of rotation A relative to an actuator support 120s coupled to base 14, first and second armrest movers 121, 122 cooperate to provide means for pivoting first and second armrests 21, 22 in opposite directions 21w, 22w away from one another to widen base 14 as suggested in FIGS. 1A and 1B. Owing to a coupling between first armrest 21 and first side wing 31 established by first side wing mover 131 as suggested diagrammatically in FIGS. 1A and 2A and illustratively in FIGS. 4A, B and 6A, B, first side wing 31 is constrained to pivot about first Z-axis Z1 in response to pivoting movement of first armrest 21 about first Y-axis Y1 and in the same rotational direction to widen seat back 16.

Alternatively, by rotating rotatable actuator 12 in, for example, a counterclockwise direction CCW about axis of rotation A relative to actuator support 120s, first and second armrest movers 121, 122 cooperate to provide means for pivoting first and second armrests 21, 22 in opposite directions 21n, 22n toward one another to narrow base 14 as also suggested in FIGS. 1A and 1B. Owing to a coupling between second armrest 22 and second side wing 32 established by second side wing mover 132 as suggested diagrammatically in FIGS. 1A and 2A, second side wing 32 is constrained to pivot about second Z-axis Z2 in response to pivoting movement of second armrest 22 about second Y-axis Y2 and in the same rotational direction to narrow seat back 16.

Figure 2B:
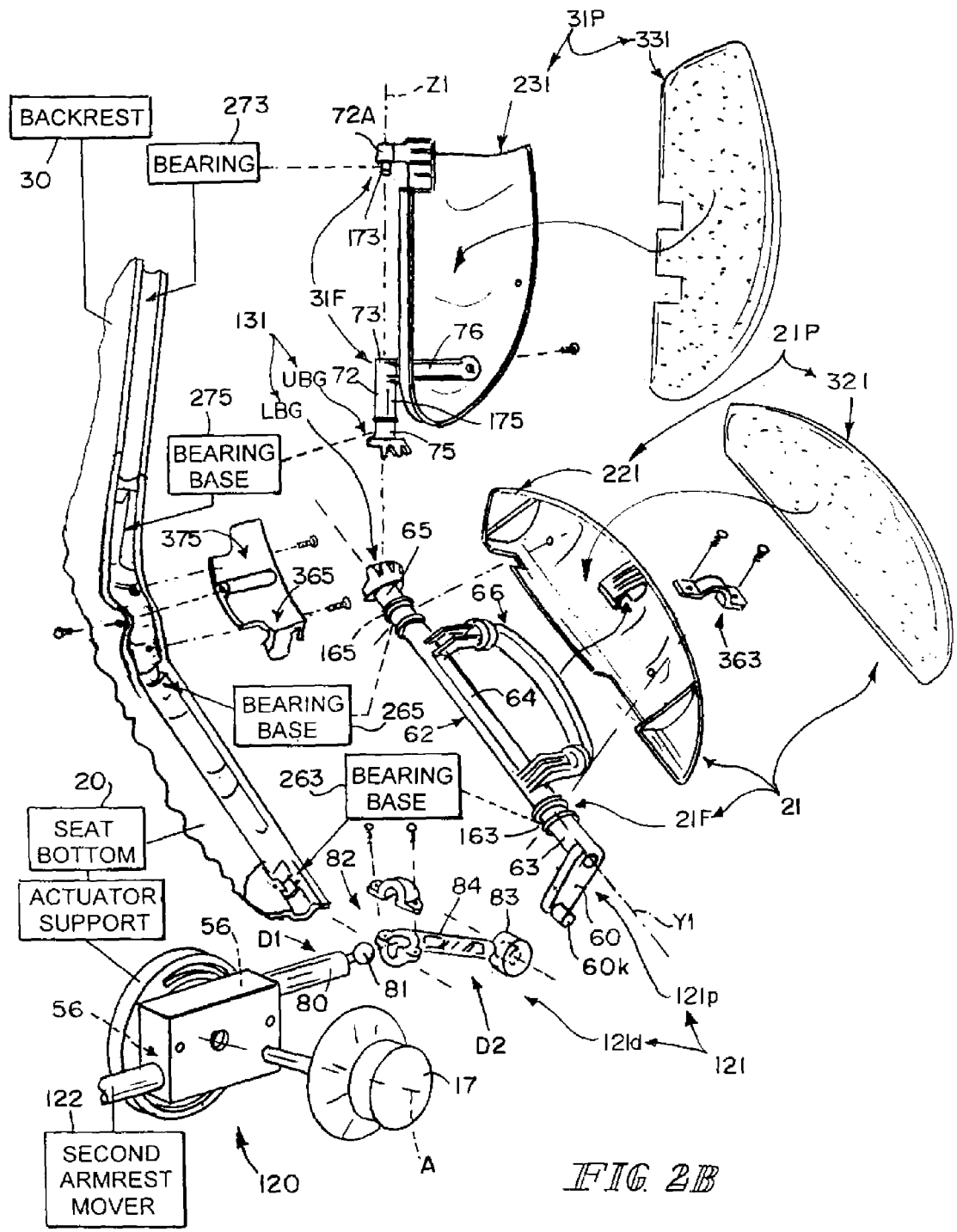
FIG. 2B is an exploded perspective assembly view showing a portion of a right edge of the seat bottom and backrest and showing components that cooperate to form the actuator, first armrest, first armrest mover, first side wing, and first side wing mover and showing that the first side wing mover comprises a lower bevel gear associated with the first armrest and an upper bevel gear associated with the first side wing and configured to mate with the lower bevel gear.
Figures 4A, 4B:
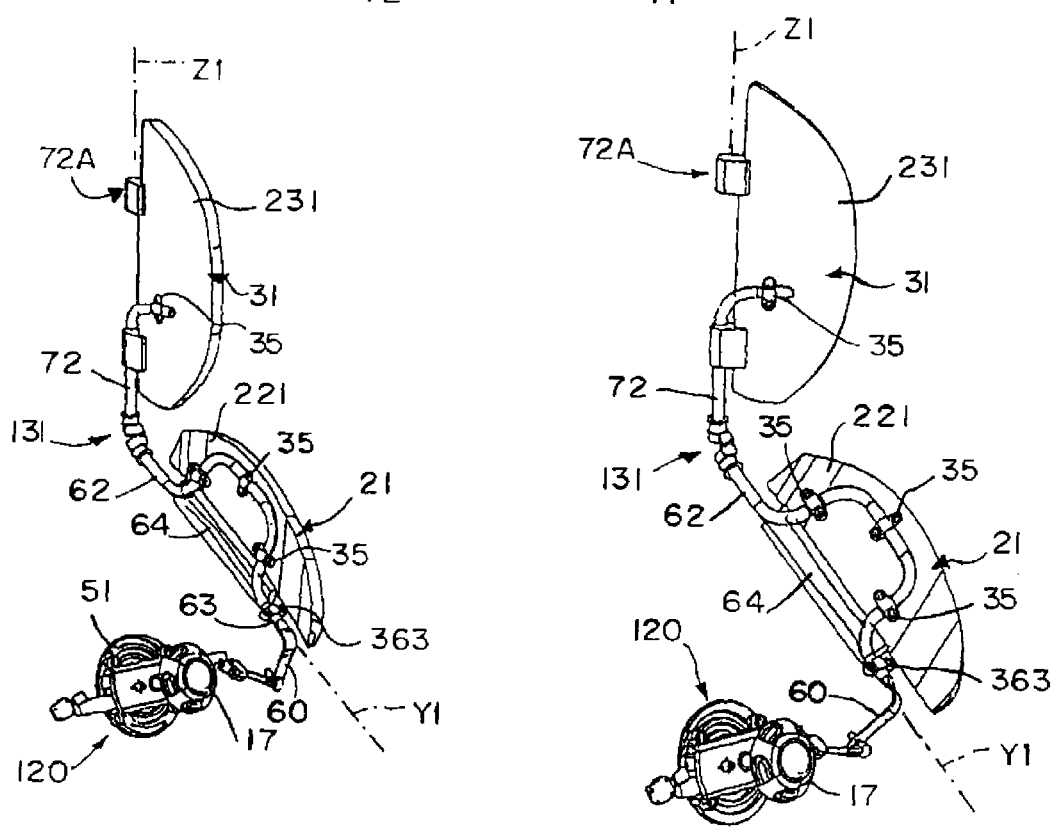
FIG. 4A is a perspective view showing the first armrest in the upright position (associated with a narrowed base) and first side wing in the forward position (associated with a narrowed seat back)
FIG. 4B is a diagrammatic perspective view similar to FIG. 4A showing clockwise rotation of the rotatable actuator to operate (1) the first armrest mover to pivot the first armrest in a clockwise direction about the first Y-axis to assume a spread position associated with a widened base and (2) the first side wing mover to pivot the first side wing in a clockwise direction about the first Z-axis to assume a spread position associated with a widened seat back.

First armrest mover 121 includes a first armrest pivoter 121p coupled to first armrest 21 and a first pivoter driver 121d coupled to actuator 120 and to first armrest pivoter 121p as suggested diagrammatically in FIG. 2A and illustratively in FIGS. 2B, 4A, and 4B. In use, rotation of actuator 120 about axis of rotation A moves first pivoter driver 121d to cause movement of first armrest pivoter 121p so as to cause first armrest 21 to pivot about first Y-axis Y1.

First side wing mover 131 is configured to provide means for rotating first Z-axis pivot support frame 31F to cause first side wing 31 to pivot about first Z-axis Z1 relative to backrest 30 in response to pivoting movement of first armrest 21 about first Y-axis Y1 relative to seat bottom 20 so that seat back 16 is widened or narrowed during widening or narrowing of base 14. In an illustrative embodiment, first side wing mover 131 includes a lower bevel gear LBG coupled to a free end of first armrest pivoter 121p to rotate therewith about first Y-axis Y1 and an upper bevel gear UBG coupled to a free end of first side wing pivoter 131p to rotate therewith about first Z-axis Z1 as suggested in FIGS. 2B, 6A, and 6B. Bevel gears LBG and UBG are intermeshed and configured to cooperate to provide means for rotating first side wing pivoter 131p about first Z-axis Z1 in response to rotation of first armrest pivoter 121p about first Y-axis Y1.

Figure 6A:
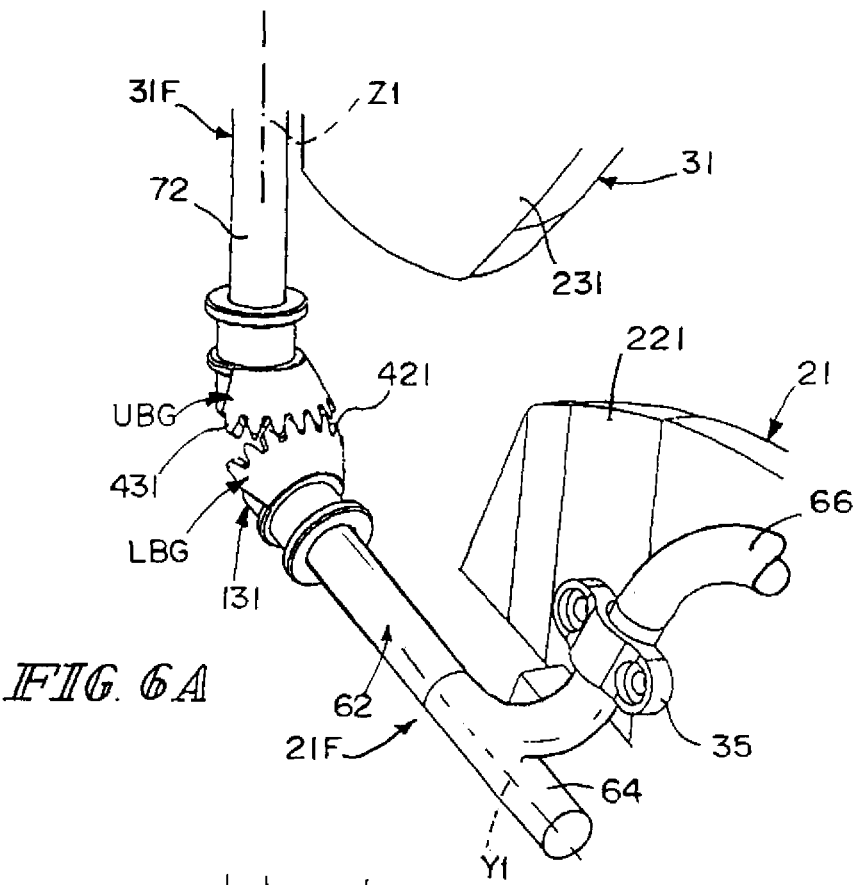
FIG. 6A is an enlarged perspective view of a pair of mating bevel gears cooperating to define the first side wing mover and shown in FIGS. 4A and 5A wherein the upper bevel gear is associated with the first side wing and the lower bevel gear is associated with the first armrest and meshed with the upper bevel gear to cause the upper bevel gear to turn about the first Z-axis in response to turning of the lower bevel gear about the first Y-axis.

Upper bevel gear UPG of first side wing mover 131 is mounted and supported for rotation about first Z-axis Z1 as suggested in FIG. 6A. Upper bevel gear UBG is mounted to rotate on a shaft 72 included in first side wing pivoter 131p and supported for rotation about first Z-axis Z1.

Lower bevel gear LBG of first side wing mover 131 is mounted to rotate on shaft 62 included in first Y-axis pivot support frame 21F and supported for rotation about first Y-axis Y1. The axes Y1 and Z1 of shafts 62 and 72, respectively, intersect when gears UBG and LBG are mated in intermeshing relation to one another as suggested in FIGS. 6A and 6B.

Second armrest mover 122 includes a second armrest pivoter 122p coupled to second armrest 22 and a second pivoter driver 122d coupled to actuator 120 and to second armrest pivoter 122p as suggested diagrammatically in FIG. 2A. In use, rotation of actuator 120 about axis of rotation A moves second pivoter driver 122d to cause movement of second armrest pivoter 122p to cause second armrest 22 to pivot about second Y-axis Y2.

Second side wing mover 132 is configured to provide means for rotating second Z-axis pivot support frame 32F to cause second side wing 32 to pivot about second Z-axis Z2 relative to backrest 30 in response to pivoting movement of second armrest 22 about second Y-axis Y2 relative to seat bottom 20 so that seat back 16 is widened or narrowed during widening or narrowing of base 14. Each of first and second side wing movers 131, 132 are arranged to lie on an X-axis X as suggested in FIG. 2A.

Illustrative embodiments of components that cooperate to form first armrest 21 and first side wing 31 are shown in FIG. 2B. Illustrative embodiments of components that cooperate to form first armrest mover 121 and first side wing mover 131 are also shown in FIG. 2B.

First armrest 21 includes a first armrest pad 21P (see FIGS. 2A and 2B) coupled to first Y-axis pivot support frame 21F to pivot therewith. First armrest pad 21P includes an outer panel 221 coupled to first Y-axis pivot support frame 21F to move (i.e., pivot) therewith and an inner panel 321 coupled to outer panel 221 to move therewith as suggested in FIG. 2B. In an illustrative embodiment, outer panel 221 is a hard shell made of a plastics material and inner panel 321 is a cushion or pad made of an expanded foam material. Second armrest 22 has a construction similar to first armrest 21 in illustrative embodiments and includes a second armrest pad 22 and a second Y-axis pivot support frame 22F as suggested in FIG. 2A.

First side wing 31 includes a first side wing pad 31P (see FIGS. 2A and 2B) coupled to first Z-axis pivot support frame 31F to pivot therewith. First side wing pad 31P includes an outer panel 221 coupled to first Z-axis pivot support frame 31F to move (i.e., pivot) therewith and an outer panel 331 coupled to outer panel 231 to move therewith as suggested in FIG. 2B. In an illustrative embodiment, outer panel 231 is a hard shell made of a plastics material and inner panel 331 is a cushion or pad made of an expanded foam material. Second side wing 32 has a construction similar to first side wing 31 in illustrative embodiments and includes a second side wing pad 32P and a second Z-axis pivot support frame 32F as suggested in FIG. 2A.

First armrest pivoter 121p of first armrest mover 121 includes a crank lever 60 coupled at one end thereof to a rotatable shaft 62 as shown, for example, in FIG. 2B. First armrest pivoter 121 also includes a knob 60K coupled to an opposite end of crank lever 60 as also shown in FIG. 2B.

First pivoter driver 121d is configured to interconnect an output link 56 of actuator 120 and crank lever 60 of first armrest pivoter 121p as suggested diagrammatically in FIG. 2A and illustratively in FIG. 2B to define means for applying a torque to armrest pivoter 121p to cause pivoting movement of first armrest 21 about first Y-axis Y1 in response to lateral movement of output link 56 of actuator 120. First pivoter driver 121d includes a first driver D1 comprising a shaft 80 coupled to a companion output link 56 to move therewith and a ball 81 coupled to a free end of shaft 80 as suggested in FIG. 2B. First pivoter driver 121d also includes a second driver D2 comprising a ball-receiving socket 82, at one end thereof, a knob-receiving socket 83 at an opposite end thereof, and a rod 84 arranged to extend between and interconnect sockets 82, 83 as suggested in FIG. 2B. The first and second drivers D1, D2 cooperate to provide means for turning crank lever 60 about first Y-axis Y1 to rotate first Y-axis support frame 21F about first Y-axis Y1 (and pivot first armrest 21 about first Y-axis Y1) in response to rotation of control button 17 in actuator 120 about axis of rotation A. Ball 81 of first driver D1 is received for ball-joint movement in a companion chamber formed in ball-receiving socket 82 and crank knob 60K is received for rotational movement in a companion chamber formed in knob-receiving socket 83.

First Y-axis pivot support frame 21F includes a rotatable shaft 62 having an outer end 63 coupled to crank 60 and an opposite inner end 65 coupled to lower bevel gear LBG. First Y-axis pivot support frame 21F also includes a C-shaped lever 66 coupled to a mid-section 64 of rotatable shaft 62 to rotate therewith about first Y-axis Y1 as suggested in FIG. 2B. Lever 66 is coupled to first armrest 21 to cause first armrest pad 21P to pivot about first Y-axis Y1 in response to pivoting movement of lever 66 about first Y-axis Y1 caused by rotation of rotatable shaft 62 about first Y-axis Y1.

An outer journal 163 is provided on outer end 63 of rotatable shaft 62 and configured to mate in rotative bearing engagement with a bearing base 263 included in seat bottom 20 as suggested diagrammatically in FIG. 2B. A companion bearing cap 363 is coupled to seat bottom 20 using any suitable means to retain outer journal 163 in rotative bearing engagement with each of bearing base and cap 263, 363 during pivoting motion of first armrest 21 accompanying rotation of rotatable shaft 62 about first Y-axis Y1.

An inner journal 165 is provided on inner end 65 of rotatable shaft 62 and configured to mate in rotative bearing engagement with a bearing base 265 included in seat bottom 20 as suggested diagrammatically in FIG. 2B. A companion bearing cap 365 is coupled to seat bottom 20 using any suitable means to retain inner journal 165 in rotative bearing engagement with each of bearing base end cap 265, 365 during pivoting motion of first armrest 21 accompanying rotation of rotatable shaft 62 about first Y-axis Y1.

First Z-axis pivot support frame 31F of first side wing 31 includes a rotatable shaft 72 having lower end 75 coupled to upper bevel gear UBG and an opposite upper end 73 and a lever arm 76 coupled at one end to upper end 73 of rotatable shaft 72 and coupled at an opposite end to first side wing 31. Lever arm 76 is coupled to first side wing 31 to cause first side wing 31 to pivot about first Z-axis Z1 in response to pivoting movement of lever arm 76 about first Z-axis Z1 caused by rotation of rotatable shaft 72 about first Z-axis Z1.

A lower journal 175 is provided on lower end 75 of rotatable shaft 72 and configured to mate in rotative bearing engagement with a bearing base 275 included in seat bottom 20 as suggested diagrammatically in FIG. 2B. A companion bearing cap 375 is coupled to seat bottom 20 using any suitable means to retain lower journal 175 in rotative bearing engagement with each of bearing base and cap 275, 375 during pivoting motion of first side wing 31 accompanying rotation of rotatable shaft 72 about first Z-axis Z1.

First Z-axis pivot support frame 31F of first side wing 31 further includes a rotatable auxiliary shaft 72A as suggested in FIG. 2B. An upper journal 173 also included in first Z-axis pivot support frame 31F is coupled to rotatable auxiliary shaft 72A as suggested in FIG. 2B. Upper journal 173 is a cantilevered pin arranged to extend along first Z-axis Z1 in a direction toward rotatable shaft 72. Upper journal 173 extends into an aperture formed in a bearing 273 formed in backrest 30 to retain upper journal 173 in rotative bearing engagement with bearing 273 during pivoting motion of first side wing 31 accompanying rotation of rotatable shaft 72 and rotatable auxiliary shaft 72A about first Z-axis Z1.

Juvenile vehicle seat 10 comprises width controller 12, which can be seen in an illustrative form in FIGS. 4A and 4B, configured so as to control the movement, in particular the pivoting of the first and second armrests 21, 22 and first and second side wings 31, 32 with respect to the rest of the structure of juvenile vehicle seat 10. First and second side wings 31, 32 are constrained to pivot relative to backrest 30 and to one another in response to pivoting movement of first and second armrests 21, 22 relative to seat bottom 20 and to one another as suggested in FIGS. 1A and 1B owing to inclusion of first and second swing movers 131, 132 in juvenile vehicle seat 10.

Seat 10 is shown in FIG. 1A when armrests 21, 22 and side wings 31, 32 are in a proximal position, while FIG. 2 shows these same armrests 21, 22 and side wings 31, 32 in the separated or spaced-apart position. The angular movement or pivoting of armrests 21, 22 and side wings 31, 32 can enable the configuration of seat 10 to be adapted to the child's physique, for example.

Figure 3:
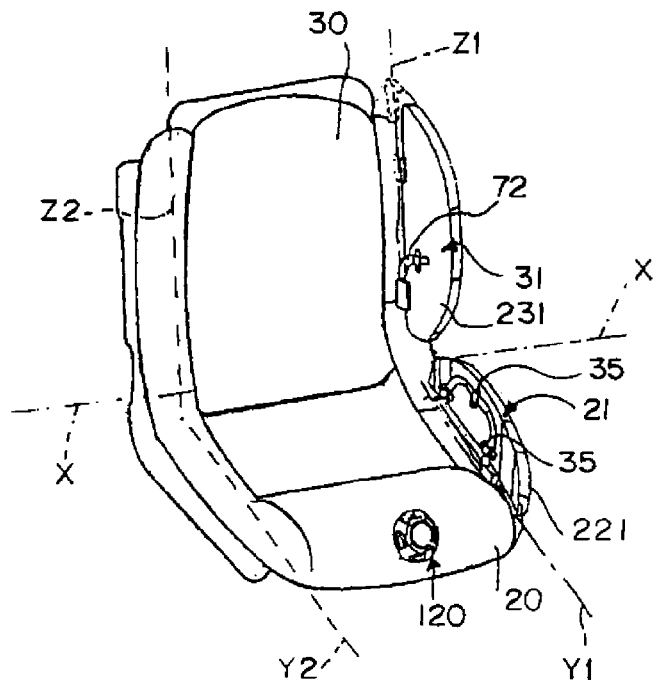
FIG. 3 is a diagrammatic perspective view of the seat of FIGS. 1 and 2 showing the first armrest in an upright position also shown in FIG. 1 with a panel removed to expose a linkage defining a portion of the first Y-axis pivot support frame included in the first armrest and showing the first side wing in a forward position also shown in FIG. 1 with a panel removed to expose a linkage defining a portion of the first Z-axis pivot support frame included in the first side wing and showing illustrative X-, Y-, and Z-axes associated with the juvenile vehicle seat.

A structural part of seat bottom 20 and backrest 30 as well as a first armrest 21 and a first side wing 31 without lining elements 321, 331 is shown, for example, in FIG. 3. First armrest 21 comprises a first frame element 21F. First side wing 31 comprises a second frame element 31F. The second frame element 31F is distinct from the first frame element 21F. The first and second frame elements 21F and 31F can belong to the same plane corresponding to plane P of the sheet in FIG. 5A, at least in the proximal position shown in this figure.

First armrest 21 also comprises, in the example shown, a first profile 221, while first side wing 31 comprises a second profile (outer panel) 231 as suggested in FIGS. 2B, 4A, and 4B. The first and second profiles 221 and 231 consist in this example of plates on which shock absorber devices 321, 331 are adapted, which are not shown for the sake of clarity of the drawing, so as to laterally protect a child (not shown) seated in seat 10. The first and second frame elements 21F and 31F are respectively connected to the first and second profiles 221 and 231, by means, in the example shown in FIGS. 4A and 4B, of a plurality of screwed plates 35, enabling the frame elements to be held and attached, by means of screws, to the corresponding profile. The frame elements 21F, 31F can be attached to the profiles differently as suggested in FIG. 2B without going beyond the scope of the present disclosure. For example, the frame elements 21F, 31F can be connected to the profiles by clipping or over-molding. The frame elements can also be produced in a single piece with the profiles.

The first frame element 21F is also attached by a plate 363 to the structure of the seat as suggested in FIGS. 2B, 4A, and 4B. This attachment prevents any translation movement of the first frame element 21F with respect to the structure without, however, preventing a pivoting or rotation of the frame element with respect to the structure.

The first frame element 21F is driven in rotation about a first Y-axis Y1, which can be seen in particular in FIGS. 4A, 4B and 5A, 5B, while the second frame element 31F is capable of rotating about a first Z-axis Z1, wherein the first Z-axis Z1 can be non-perpendicular to the first Y-axis Y1 and, generally, the angle between the first Z-axis Z1 and the Y-axis Y1 can be any angle. The rotation about the first Y-axis Y1 and the first Z-axis Z1 is advantageous because it enables the movement of the armrests 21, 22 and the side wings 31, 32 to be adapted to the child's physique.

Figure 5A:
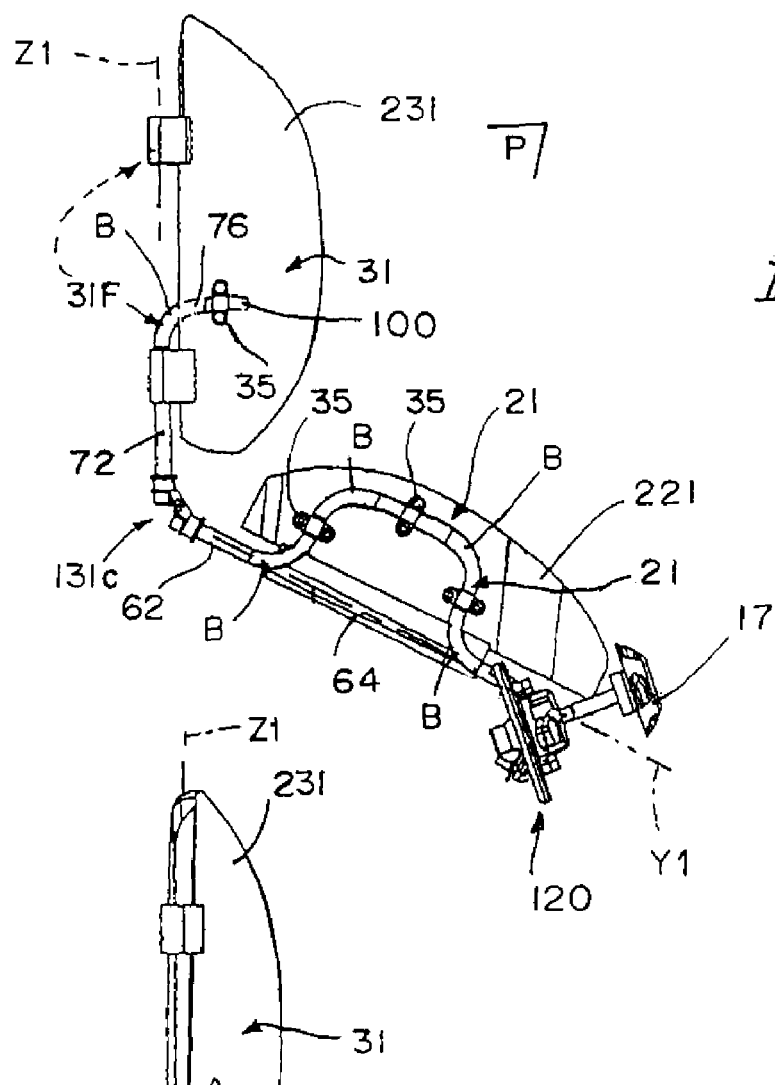
FIG. 5A is an enlarged side elevation view of the assembly shown in FIG. 4A.
Figure 5B:
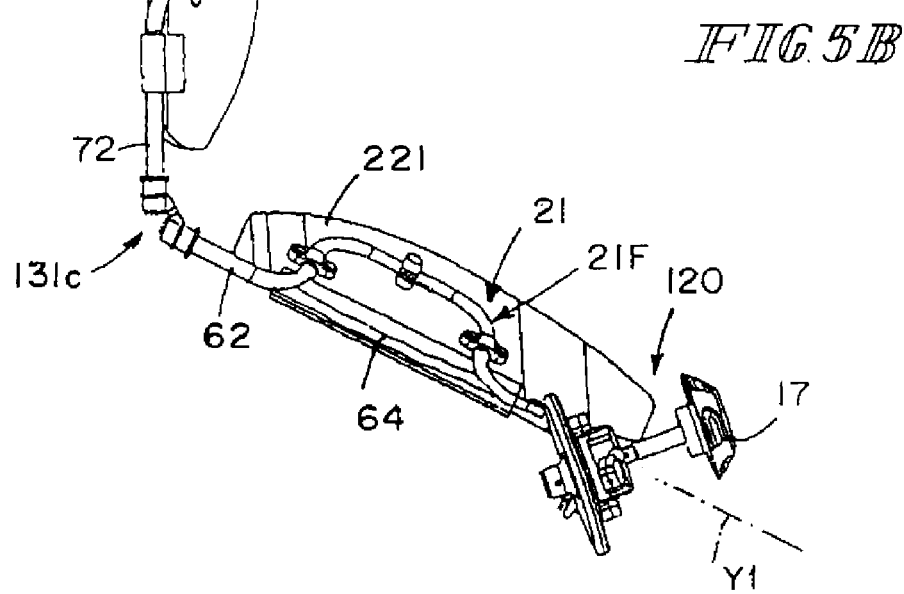
FIG. 5B is an enlarged side elevation view of the assembly shown in FIG. 4B.
Figure 6B:
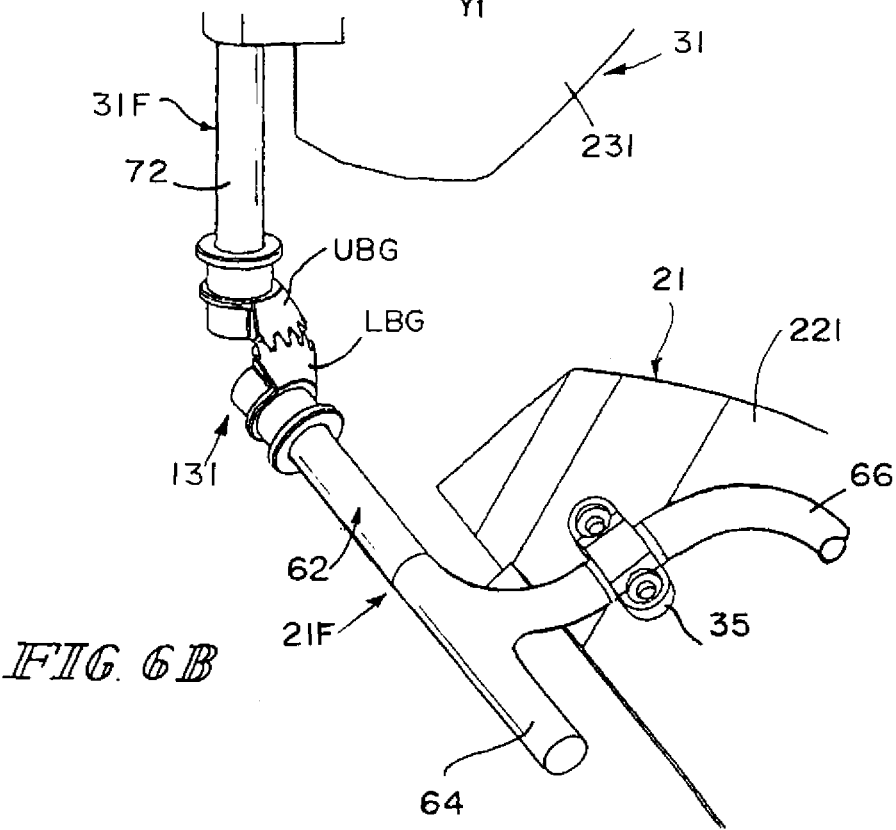
FIG. 6B is a view similar to FIG. 6A showing the orientation of a pair of mating bevel gears comprising the first side wing mover after the first armrest and first side wing have been pivoted from the initial (e.g., upright and forward) positions shown in FIG. 6A to assume the spread positions shown in FIG. 6B.
Figure 7:
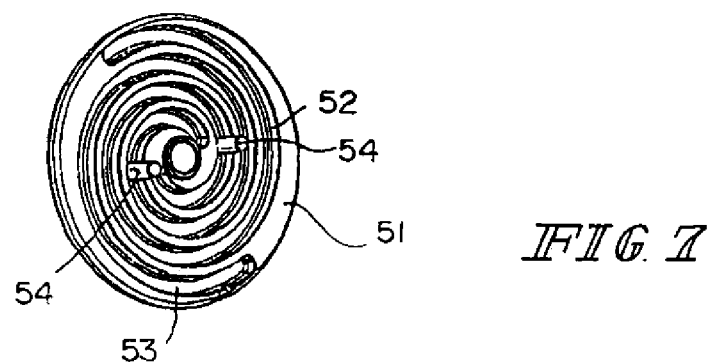
FIGS. 7-10 separately, diagrammatically, and partially, show illustrative components associated with portions of the actuator and first and second armrest movers.

As can be seen in FIGS. 4A and 4B, 5A and 5B, 6A and 6B, in particular in FIGS. 6A and 6B, first side wing mover 131 is formed between and arranged to interconnect the first frame element 21F and the second frame element 31F. The first side wing mover 131 is arranged so as to cause the second frame element 31F to move, in particular by pivoting, when, by actuation of the control means 12, the first frame element 21F is moved in particular by pivoting. The first side wing mover 131 is arranged and configured in order to convert the rotation of first frame element 21F about the first Y-axis Y1 into a rotation of second frame element 31F about the first Z-axis Z1.

In the example shown, the first side wing mover 131 is substantially located along an X-axis, which can be seen in FIG. 2A and forming the separation between seat bottom 20 and backrest 30. The X, Y, and Z axes are secants, substantially at the height of the first side wing mover 131 in this example. As shown in FIG. 3, the first Y-axis Y1 belongs to the plane of the edge of seat bottom 20 and the first Z-axis Z1 belongs to the plane of the edge of backrest 30.

In the example shown, first side wing mover 131 comprises a gear assembly, in particular a bell crank gear. Indeed, at one end of the first frame element 21F, it comprises a belled-out, cylinder portion LBG comprising, at its belled-out end, a plurality of teeth 421. The second frame element 31F comprises, at its lower end, a belled-out cylinder portion UBG comprising, at its belled-out end, a plurality of teeth 431 arranged so as to engage as suggested in FIG. 6A with the teeth 421, which become lodged in the gaps located between the teeth 421 as suggested in FIG. 6A. Thus, when first armrest 21 is pivoted about the first Y-axis Y1, the second frame element 31F is also caused to pivot about the first Z-axis Z1. Indeed, the belled-out toothed cylinder portion LBG causes the belled-out toothed cylinder portion UBG to rotate, thereby causing the second frame element 31F to pivot. In an alternative, the first frame element 21F and the belled-out cylinder portion LBG are produced in a single piece. Similarly, the second frame element 31F and the belled-out cylinder portion UBG can be produced in a single piece.

Width controller 12 is provided to cause armrests 21, 22 and side wings 31, 32 to pivot between an extreme proximal position shown, for example, in FIG. 1A and an extreme spaced-apart position shown, for example, in FIG. 1B. Width controller 12 is configured so as to control the movement of armrests 21, 22 and side wings 31, 32 with respect to the seat bottom 20 and backrest 30, comprise the control button 17 included in actuator 120, visible on the seat and capable of being driven in rotation about axis A by a user. Actuator 120 of width controller 12 also comprises, as can be seen in greater detail in FIGS. 7 to 10, according to a non-limiting embodiment, a disk 51 comprising two grooves 52 and 53, arranged in a double spiral on the disk. Actuator 120 of width controller 12 also comprises two lugs 54 (or spiral pins) arranged to slide in each of the grooves 52 and 53, in which the lugs are free in rotation with respect to the control button 17. The disk 51 is secured in rotation with the control button 17. A pin 58 indeed rigidly connects the control button 17 to the disk 51.

Figure 8:
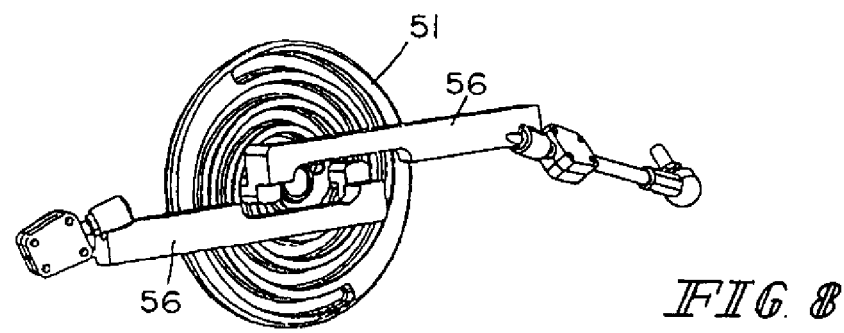
Figure 9:
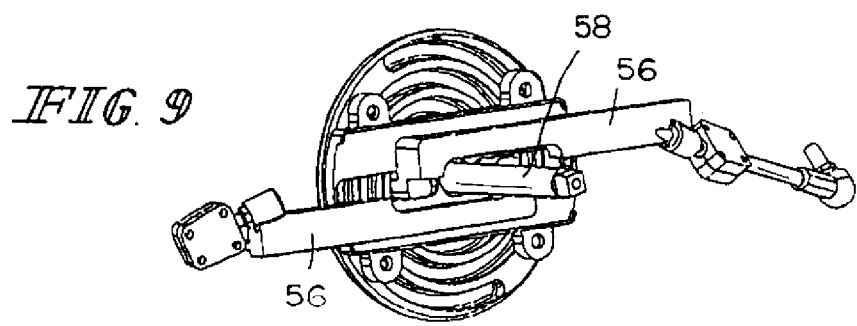
Figure 10:
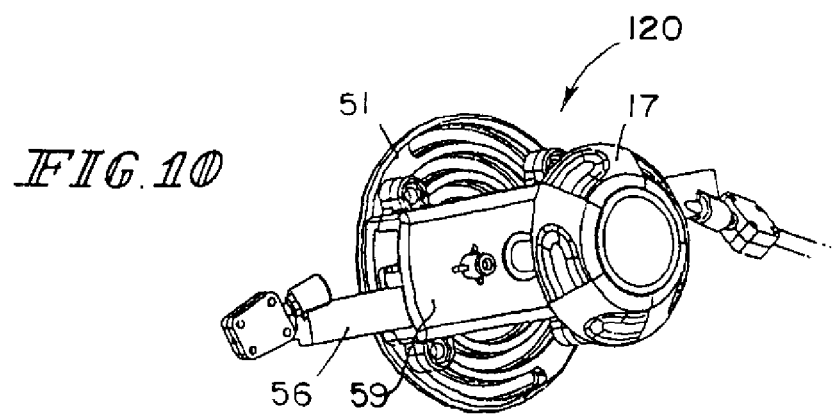

In this example shown, actuator 120 also comprises two links 56 parallel to one another and arranged opposite one another as can be seen in particular in FIG. 8. A shell 59 arranged around the links 56 enables the assembly to be secured.

The links 56 are connected to the lugs 54 and are capable of moving in lateral translation relative to one another and with respect to the disk 51 as follows. When the control button 17 is driven in rotation about axis A by a user, the disk 51 secured to the control button 17 also begins to turn about axis of rotation A, thereby causing the lugs 54 to move into the grooves 52 and 53, thereby enabling the links 56 to move laterally by spacing them apart from one another or bringing them toward one another according to the direction of rotation of the disk 51. The lateral translation movement of the links 56 causes the first frame element 21F to move, and the links 56 and the first frame element 21F are connected to one another by a connection so that the relative spacing apart of the links 56 causes first and second armrests 21, 22, and therefore first and second side wings 31, 32, to move toward one another, while the relative approaching of the links 56 causes first and second armrests 21, 22 and first and second side wings 31, 32 to be spaced apart. The connection between the link 56 and an end 63 of the first frame element 21F comprises a bent rod 60, forming an angle with the link 56 on the one hand, and extending in the extension of the first frame element 21F on the other hand. The end of the rod 60, which is connected to the first frame element 21F, is attached relative to it. The end of the rod 60 connected directly or indirectly to the link 56 is attached to it according to a pivot connection. Thus, a movement of the link 56 drives the rod 60 and therefore the first frame element 21F in rotation about first Y-axis Y1. The rod 60 and the first frame element 21F can be produced in a single piece or, as in the example shown in FIGS. 4A and 4B, with two different pieces. In an alternative, the reverse movement of the links 56 can cause this same effect.

The first frame element 21F and/or the second frame element 31F can form, in one or more places, at least one bend B, and in particular four bends B for the first frame element 21F and one bend B for the second frame element 31F as suggested in FIG. 5A. These bends can enable the pivoting of the profiles 221 and 231 to be better accomplished. A first portion 62 of the first frame element 21F extends according to the first Y-axis Y1, at the ends of the first frame element 21F associated with the control means 120 and the first side wing mover 131. A second portion 66 of the first frame element 21F, attached by the plates 35 to the profile 221, due to the bends B formed on the first frame element 21F, extends substantially perpendicularly to the first Y-axis Y1, so as to transmit to the profile 231 the rotation to which the first frame element 21F is subjected. Similarly, a first portion 72 of the second frame element 31F, namely the end portion associated with the first side wing mover 131, extends according to the first Z-axis Z1, while a second portion 76 of the second frame element 31F extends substantially perpendicularly to the first Z-axis Z1, after the bend B. The second frame element 31F comprises an end 100 located behind the second profile 231 in the embodiment shown in FIG. 5A.

The first and second profiles 221 and 231 are connected to the seat bottom 20 and to the backrest 30, respectively, by pivot support frames 21F and 31F as suggested in FIG. 5A enabling a rigid connection with seat bottom 20 and backrest 30, without, however, preventing rotation of armrests 21, 22 and side wings 31, 32 with respect to the structure 20, 30.

Figure 11:
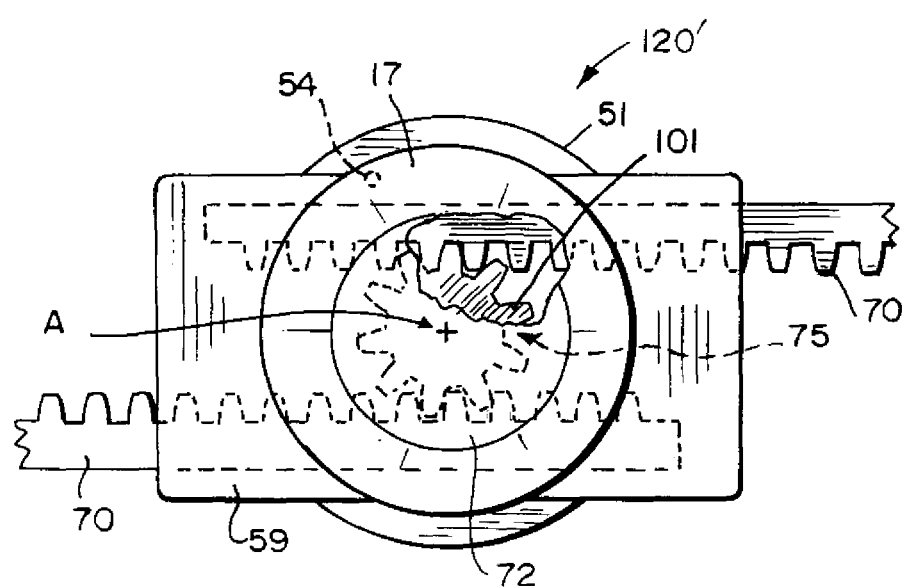
FIG. 11 is a plan view, with portions broken away, of an alternative rack-and-pinion actuator in accordance with the present disclosure.

Another embodiment of the actuator 120' is described in view of FIG. 11. In this example, the links 56 are replaced by racks 70. Actuator 120' comprises, in this example, a single lug and a single curved groove 52 formed on the disk 51, in which the movement of the lug 54 in the groove 52 causes the simultaneous movement of the two racks 70 by means of an idler sprocket 101 mounted around the rotation axis A of the control button 17.

In this example as well, actuator 120' comprises disengagement means 75 configured so as to enable the tilting of at least one of armrests 21, 22 and/or at least one of side wings 31, 32 in an installation position substantially in the extension of seat bottom 20 and backrest 30, respectively, so as to facilitate the installation of a child in seat 10.

The disengagement means is arranged, in the example shown, to enable the extraction of the lug 54 from the groove 52 of the disk 51. To do this, the disengagement means 75 comprises in this example, a disengagement button 72 enabling the installation position to be achieved when a force is exerted on at least one of the armrests 21, 22 and/or side wings 31, 32.

In this embodiment, the disengagement button 72 is placed on the control button 17 and the disengagement occurs at the level of the disk, therefore simultaneously for the armrests 21, 22 and the side wings 31, 32. In another embodiment, the disengagement can be performed at the level of each armrest 21, 22 or side wings 31, 32. In this case, the disengagement means 75 can enable a single armrest and a single side wing to be disengaged. The disengagement button can also be placed elsewhere, for example, at the level of an armrest.

The disengagement button 72 arranged on the control button 17 is arranged so as to enable the lug 54 to be extracted by pushing the disk in order to disengage the lug from the groove, so as to be capable, by pressing on an armrest, of forcing the pivoting thereof. This can enable the armrest to be spaced apart in an extreme manner so that the child can be installed easily in the seat. A system can, in this case, be provided so as to force the user to return the armrest(s) to a closer position in order to maximize the lateral protection of the child during travel.

As shown in FIGS. 1 and 2, only the control button 17 can be visible by the user of seat 10, as the other elements of the width controller 12 are concealed by the covering or in the structure. Seat bottom 20, backrest 30, armrests 21, 22, and side wings 31, 32 are covered with lining elements made up of a fabric and foam, for example.

In particular, the first side wing mover 31F can consist of any type of connection other than a bell crank gear, for example, a gimbal or a flexible bell crank.

The child-restraint harness 18 can be integrated in the seat or be replaced by a three-point belt of the motor vehicle, in which case the child-restraint harness 18 is not present on the seat, in particular for seats for older children.

The seat may or may not comprise a base. Such a base, which is not shown in the figures, can be useful to enable the backrest to be tilted.

According to an embodiment of the present disclosure, the first and second frame elements 121p, 131p are distinct and connected by first side wing mover 131. It should be noted that the frame formed by the first and second frame elements can also consist of a single piece having flexibility or flexible connection means connecting the first and second frame elements together, and adapted so as to transmit a movement imparted on one of the frame elements by the control means to the other frame element, without going beyond the scope of the present disclosure.

The invention claimed is:

1. A juvenile vehicle seat comprising
   a base including a seat bottom, a first armrest mounted on the seat bottom for pivotable movement about a first Y-axis toward and away from the seat bottom, and a second armrest mounted on the seat bottom for pivotable movement about a second Y-axis toward and away from the seat bottom, a seating surface provided on the seat bottom being arranged to lie between the first and second armrests,
   a seat back including a backrest arranged to extend upwardly from the seat bottom, a first side wing mounted on the backrest for pivotable movement about a first Z-axis toward and away from the backrest, and a second side wing mounted on the backrest for pivotable movement about a second Z-axis toward and away from the backrest, the backrest being arranged to lie between the first and second side wings, and
   a width controller configured to include
   base-changer means for pivoting the first and second armrests in unison relative to the seat bottom, respectively, about the first and second Y-axes, at the option of a caregiver, to change an effective width of the base on the seating surface and between the first and second armrests to cause one of (1) the first and second armrests to pivot in unison toward one another to establish a relatively narrow narrow-width base dimension and (2) the first and second armrests to pivot in unison away from one another to change the effective width of the seat base from a narrow-width base dimension to a relatively wider expanded-width base dimension so that the effective with of the seat base is adjusted to match size characteristics of a child to be seated on the seating surface of the seat bottom and between the first and second arms and
   back-changer means coupled to the base-changer means for pivoting the first and second side wings in unison relative to the backrest, respectively about the first and second Z-axes, in response to pivoting movement of the first and second armrests to change an effective width of the seat back on the backrest and between the first and second side wings to cause one of (1) the first and second side wings to pivot in unison toward one another to establish a relatively narrow narrow-width back dimension when the first and second armrests are pivoted toward one another and (2) the first and second side wings to pivot in unison away from one another to change the effective width of the seat back from a narrow-width back dimension to a relatively wider expanded-width back dimension so that the effective width of the seat back is adjusted during adjustment of the effective width of the base to match size characteristics of the child to be seated on the seating surface of the seat bottom.

2. The juvenile vehicle eat of claim 1, wherein the base-changer means includes an actuator support coupled to the base, an actuator mounted on the actuator support for movement relative to the base, a first armrest mover arranged to interconnect the actuator and the first armrest and supported for movement relative to the base to impart pivoting motion to the first armrest in response to movement of the actuator relative to the base, and a second armrest mover arranged to interconnect the actuator and the second armrest and supported for movement relative to the base to impart pivoting motion to the second armrest in response to movement of the actuator relative to the base and the back-changer means includes a first side wing mover arranged to interconnect the first armrest and first side wing and a second side wing mover arranged to interconnect the second armrest and the second side wing.

3. The juvenile vehicle seat of claim 2, wherein the actuator is mounted for rotation about an axis of rotation in one of a first direction to move the first and second armrest movers in a first manner relative to the base to pivot the first and second armrests toward one another to cause pivoting movement of the first and second side wings toward one another to narrow the effective width of the base and the seat back and an opposite second direction to move the first and second armrest movers in a different second manner relative to the base to pivot the first and second armrests away from one another to cause pivoting movement of the first and second side wings away from one another to widen the effective width of the base and the seat back.

4. The juvenile vehicle seat of claim 2, wherein the first side wing mover includes a first lower bevel gear coupled to the first armrest to pivot therewith and a first upper bevel gear coupled to the first side wing to pivot therewith and intermeshed with the first lower bevel gear to cause the first upper bevel gear to rotate about the first Z-axis and pivot the first side wing about the first Z-axis in response to rotation of the first lower bevel gear about the first Y-axis during pivoting of the first armrest about the first Y-axis.

5. The juvenile vehicle seat of claim 4, wherein the first armrest includes a Y-axis pivot support frame coupled to the actuator and to the first lower bevel gear and arranged to pivot about the first Y-axis and a first armrest pad coupled to the Y-axis pivot support frame to pivot therewith.

6. The juvenile vehicle seat of claim 5, wherein the first side wing includes a Z-axis pivot support frame coupled to the first upper bevel gear and arranged to pivot about the first Z-axis and a first side wing pad coupled to the Z-axis pivot support frame to pivot therewith.

7. The juvenile vehicle seat of claim 4, wherein the first side wing includes a Z-axis pivot support frame coupled to the first upper bevel gear and arranged to pivot about the first Z-axis and a first side wing pad coupled to the Z-axis pivot support frame to pivot therewith.

8. A juvenile vehicle seat comprising
   a base including a seat bottom and an armrest mounted on one side of the seat bottom for pivotable movement relative to and toward and away from the seat bottom,
   a seat back including a backrest extending upwardly from a rear portion of the seat bottom and a side wing mounted on one side of the backrest to lie above and in close proximity to the armrest for pivotable movement relative to and toward and away from the backrest, and a width controller including a side wing mover coupled to the armrest and the side wing and configured to pivot the side wing in response to pivoting movement of the armrest.

9. The juvenile vehicle seat of claim 8, wherein the width controller further comprises an actuator including an actuator button mounted for rotation about an axis of rotation and a first armrest mover arranged to interconnect the actuator and the first armrest and configured to provide means for pivoting the first armrest about a first pivot axis relative to the seat bottom in response to rotation of the actuator button about the axis of rotation to cause the side wing to pivot about a second pivot axis relative to the backrest.

10. The juvenile vehicle seat of claim 8, wherein the side wing mover includes a lower bevel gear coupled to the first armrest to pivot therewith and an upper bevel gear coupled to the first side wing to pivot therewith and intermeshed with the lower bevel gear to cause the upper bevel gear to rotate about a first Z-axis and pivot the first side wing about the first Z-axis in response to rotation of the lower bevel gear about a first Y-axis during pivoting of the first armrest about the first Y-axis.

11. A juvenile vehicle seat for a child, intended to be mounted on a motor vehicle seat, the juvenile vehicle seat comprising
a structure comprising at least a seat bottom and a backrest, in which each lateral edge of the seat bottom is equipped with an armrest and each lateral edge of the backrest is equipped with a side wing, and control means for enabling movement of the armrests and the side wings with respect to the structure to be controlled,
characterized in that the seat comprises, on each lateral edge of the structure,
a first frame element of one of the armrests,
a second frame element of one of the side wings, and
a side wing mover between the first frame element and the second frame element, arranged so as to move one of the frame elements when a movement is imparted on the other of the frame elements by actuation of the control means.

12. The seat of claim 11, characterized in that the movement of said first frame element and the second frame element is a pivoting movement.

13. The seat of claim 12, characterized in that the first frame element pivots about a Y-axis substantially parallel to a plane defined by the seat bottom, and in that the second frame element pivots about a Z-axis substantially parallel to a plane defined by the backrest.

14. The seat of claim 13, wherein the side wing mover located between the first and second frame elements is located along an X-axis forming a separation between the seat bottom and the backrest and intersecting with the Y and Z axes.

15. The seat of claim 11, characterized in that the control means comprise a control button capable of moving in rotation, enabling a user to actuate the control means in order to modify orientation of the armrests and the side wings.

16. The seat of claim 15, characterized in that the control button is arranged on the seat bottom, on a portion extending toward a front of the seat bottom.

17. The seat of claim 15, wherein the control means comprises
a disk secured in rotation with the control button, which disk includes a curved groove,
a lug arranged so as to slide in the curved groove, and
at least one connection part connecting the lug to the first frame element, wherein the connection part is configured so that the movement of the lug in the curved groove drives the movement, in particular the pivoting, of the first frame element.

18. The seat of claim 15, wherein the connection part comprises at least one rack and/or at least one link connected to the lug and capable of moving in translation with respect to the disk.

19. The seat of claim 15, characterized in that the control means comprises disengagement means configured so as to enable at least one of the armrest and/or at least one of the side wings to tilt in an installation position, in which the armrest extends substantially in the extension of the seat bottom and/or, respectively, the side wing extends substantially in the extension of the backrest so as to facilitate the installation of a child in the seat.

20. The seat of claim 15, characterized in that the disengagement means is arranged so as to enable the lug to be extracted from the curved groove of the disk.

21. The seat of claim 15, characterized in that the disengagement means comprises a disengagement button, enabling the installation position to be achieved when a force is exerted on at least one of the armrests and/or side wings.

* * * * *